United States Patent [19]

Smith et al.

[11] Patent Number: 4,548,389

[45] Date of Patent: Oct. 22, 1985

[54] REDUNDANT HIGH-PRESSURE SEAL FOR FLUID SPRING

[75] Inventors: Lawther O. Smith, Doylestown; Timothy L. Howard, Ambler; Franz A. Kautz, Southampton, all of Pa.

[73] Assignee: Fichtel & Sachs Industries, Inc., Colmar, Pa.

[21] Appl. No.: 533,202

[22] Filed: Sep. 16, 1983

Related U.S. Application Data

[63] Continuation-in-part of Ser. No. 470,788, Mar. 1, 1983, abandoned.

[51] Int. Cl.⁴ .................... F16F 3/00; F16F 5/00; F16F 13/00
[52] U.S. Cl. ...................... 267/64.11; 188/322.16; 267/124; 267/129; 277/61; 277/62; 277/123
[58] Field of Search ... 267/120, 124, 129, 64.11–64.28, 267/34, 8; 277/62, 61, 123, 205; 188/322.17, 322.16, 322.18, 322.11, 269

[56] References Cited

U.S. PATENT DOCUMENTS

| | | | |
|---|---|---|---|
| 3,207,498 | 9/1965 | Wüstenhagen et al. | 267/64.11 |
| 3,804,217 | 4/1974 | Keijzer et al. | 188/322.17 |
| 3,856,287 | 12/1976 | Freitag | 267/64.11 X |
| 3,919,509 | 11/1975 | Schnitzius | 200/61.62 |
| 4,030,716 | 6/1977 | Freitag | 267/64.11 |
| 4,108,423 | 8/1978 | Skubal | 267/64.11 |
| 4,230,309 | 10/1980 | Schnitzius | 267/124 X |
| 4,263,488 | 4/1981 | Freitag et al. | 200/52 R |
| 4,270,635 | 6/1981 | Wössner | 188/322.17 |

FOREIGN PATENT DOCUMENTS

| | | |
|---|---|---|
| 1391524 | 4/1964 | France . |
| 1440389 | 6/1976 | United Kingdom . |
| 2065266 | 6/1981 | United Kingdom . |

*Primary Examiner*—Douglas C. Butler
*Attorney, Agent, or Firm*—Brumbaugh, Graves, Donohue & Raymond

[57] ABSTRACT

A seal between a piston rod and a housing in which the piston reciprocates for preventing the escape of compressed fluid from the housing. A fixed sealing member engages the piston rod adjacent the housing wall, and a floating sealing member engages the piston rod at a location spaced from the fixed sealing member. A liquid is in the space between the sealing members.

9 Claims, 3 Drawing Figures

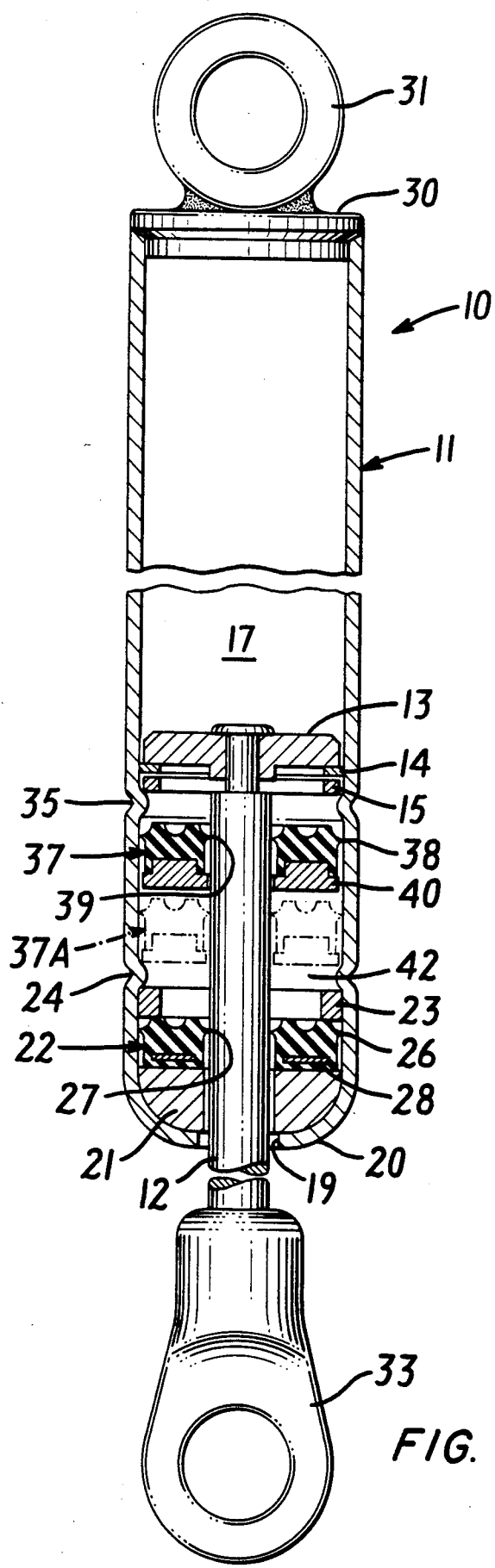
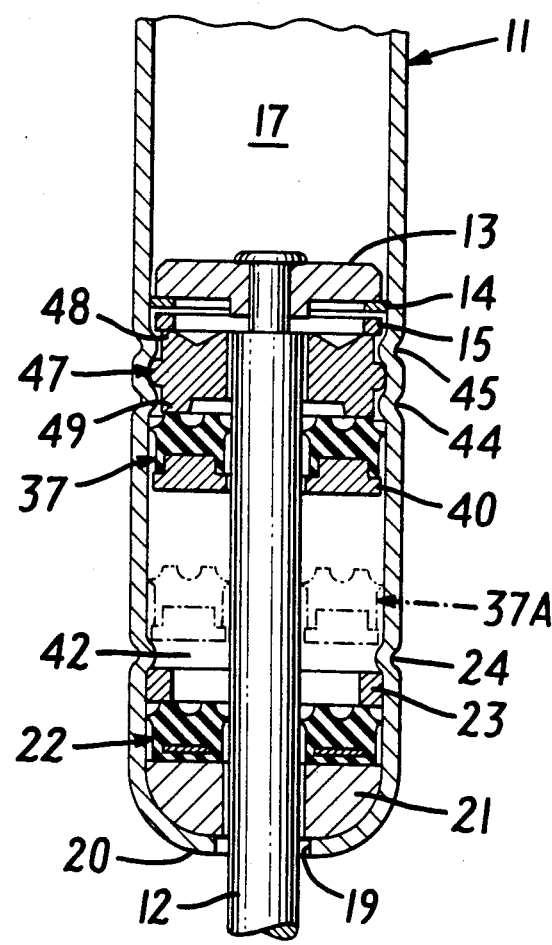
FIG. 1
FIG. 2

REDUNDANT HIGH-PRESSURE SEAL FOR FLUID SPRING

CROSS-REFERENCE TO RELATED APPLICATION

This is a continuation-in-part of U.S. application Ser. No. 470,788, filed Mar. 1, 1983, for "Seal for Fluid Spring", now abandoned.

BACKGROUND OF THE INVENTION

This invention relates to seals and, more particularly, to seal constructions adapted for use between a movable piston rod and a stationary housing to prevent the escape of compressed fluid along the piston rod.

Pneumatic springs are well known that contain gas such as air or nitrogen under high pressure in the cylinder cavity. In an attempt to prevent escape of gas from the cylinder cavity along the piston rod, a chamber containing a liquid such as oil has been provided adjacent the apertured end wall through which the piston rod reciprocates.

Such pneumatic springs may be used in resilient support columns such as disclosed in U.S. Pat. No. 3,856,287. They may also be used for biasing the tail gate of a station wagon in the open position as disclosed in U.S. Pat. No. 4,263,488 and the prior art disclosed therein. In addition, these springs may be used in pneumatic suspensions, such as disclosed in U.S. Pat. No. 4,030,716.

These springs with a liquid chamber adjacent the apertured end wall provide an excellent seal for the compressed gas. Even so, gas eventually works past the fixed seal between the liquid and gas chambers because of the pressure differential across this seal. The resulting accumulation of gas in the "liquid" chamber works past the seal at the apertured end wall much faster than does the liquid. Also, the higher concentration of gas in the "liquid" chamber results in less lubrication of the end-wall seal by the liquid, and some sensitivity to the orientation of the gas spring in a particular installation. In addition, the load on the seal between the liquid and gas chambers due to the pressure differential causes friction and wear on this seal.

SUMMARY OF THE INVENTION

The seal according to the invention includes the fixed seal adjacent the apertured end wall and the liquid chamber, but the seal between the liquid and gas chambers is free to slide toward and away from the other seal. As the fixed seal leaks or wears, the floating seal separating the liquid and gas chambers moves toward the fixed seal as liquid, usually oil, works slowly past the fixed seal.

During this slow movement of the floating seal, however, there is little friction or wear on the floating seal because of the minimal pressure differential across it. Also, the minimal pressure differential across the floating seal results in minimal passage of gas past the floating seal into the liquid chamber. This assures that mostly liquid is in contact with the fixed seal during its operating life.

With minimal gas in the liquid chamber, sufficient lubrication of the fixed seal is assured for all temperatures and orientations of the gas spring. Also, leakage past the fixed seal is low because a liquid, and especially oil, works past such seal at a slower rate than does a gas.

Eventually the floating seal is stopped adjacent the fixed seal and then acts as a secondary or safety seal, containing the remaining gas and liquid pressure in the pneumatic spring.

In another embodiment, a mechanical compression spring may be interposed between the floating seal and the fixed seal. The mechanical spring serves to bias the floating seal to its initial (most inward) position within the gas spring and resiliently to resist movement of the floating seal towards the fixed seal as fluid leakage occurs across the fixed seal. This mechanical resistance to movement of the floating seal effectively increases the pressure differential across the floating seal, thereby distributing the pressure differential between the gas chamber of the gas spring and the atmosphere in a more uniform manner over both the floating seal and the fixed seal.

The seal structure according to the invention provides longer cycle life, longer shelf life, wider operating temperature range and less sensitivity to the orientation of the pneumatic spring in its installation.

In addition, it is possible to use various seal/gas/oil combinations not otherwise possible because of material incompatibilities. This results from the fact that the gas behind the piston is isolated from the liquid in the chamber between the fixed and floating seals.

BRIEF DESCRIPTION OF THE DRAWINGS

For a better understanding of the invention, reference is made to the following detailed description of preferred embodiments thereof, taken in conjunction with the accompanying drawings, in which:

FIG. 1 is a sectional view of a seal according to the invention in a pneumatic spring;

FIG. 2 is a sectional view of another embodiment of the invention; and

DETAILED DESCRIPTION OF PREFERRED EMBODIMENTS

Figure 3:
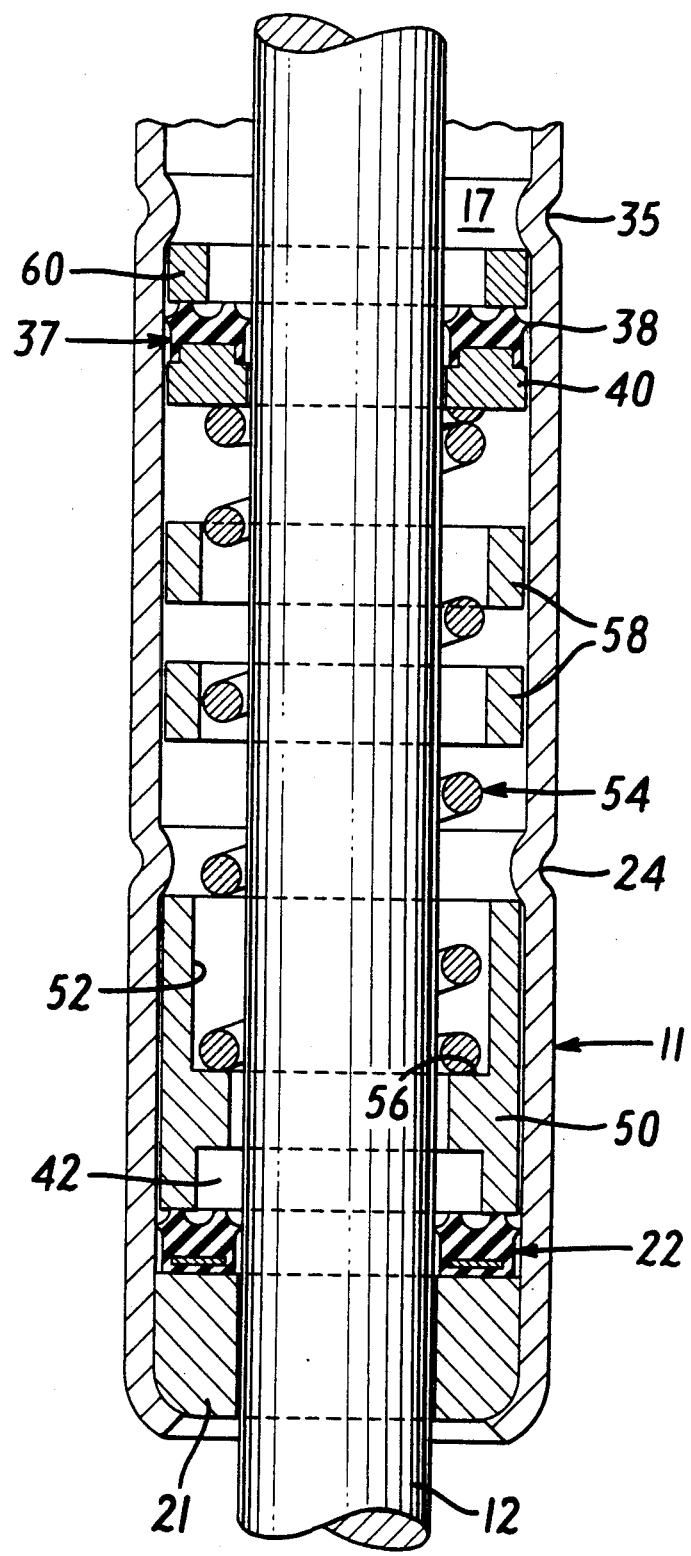
FIG. 3 is a sectional view of still another embodiment of the invention.

Referring now to FIG. 1, the seal according to the invention is shown in a pneumatic spring 10 including an axially elongated cylinder 11 of generally circular cross section. The cooperating piston assembly includes a cylindrical piston rod 12 and a piston body 13 axially fixed on the reduced end of the piston rod 12 in the cavity of the cylinder 11. The outer circular face of a piston ring 14 slidably engages the inner cylinder wall. The ring 14 is axially confined with some clearance between the piston body 13 and an apertured metal disc 15 of sharply rectangular cross section which rests on a shoulder of the piston rod 12.

The radial clearance between the piston body 13 and the cylinder wall has been exaggerated in the drawing for the sake of clarity. The diameter of the piston body 13 is sufficiently greater than that of the disc 15 to provide radial guidance for the inner end of the piston rod 12.

The chamber 17 behind the piston body 13 contains a gas, preferably air or nitrogen, under a pressure much higher than atmospheric pressure. During movement of the piston rod 12 outward of the cylinder 11 under the biasing force of this compressed gas, gas may flow from the chamber 17 past the piston body 13 only through a throttling bore (not shown) in the piston body, while during inward piston rod movement, the piston ring 14 opens an additional flow path through the apertures of the disc 15 and the clearance gap between the piston body 13 and the cylinder 11 as more fully described in U.S. Pat. No. 4,263,488 and the prior art cited therein.

The piston rod 12 is also guided axially through an aperture 19 in the end wall 20 of the cylinder 11 by a guide bushing 21 adjacent the end wall 20. A fixed annular seal 22 is retained against the bushing 21 by a backup ring 23 and an internal rib 24 formed in the side wall of the cylinder 11. The seal 22 is of elastomeric material and includes an outer annular lip 26 that engages the cylinder wall and an inner annular lip 27 that slidingly engages the piston rod 12. The seal 22 is reinforced by a flat, molded-in metal ring 28 and seals the compressed fluids within the cylinder cavity.

The opposite end of the cylinder 11 is closed by an end wall 30, on which is mounted a fastening eye 31. On the outer end of the piston rod 12 is mounted a fastening eye 33. If the pneumatic spring 10 is used to bias the tail gate of a station wagon to the open position, the eye 31 may be pivotally secured to the vehicle body and the eye 33 pivotally secured to the tail gate.

Another internal rib 35 is formed in the side wall of the cylinder 11 at a location spaced from the internal rib 24. When the piston rod 12 is pushed out of the cylinder cavity by the compressed gas, the extension of the piston rod is limited when the disc 15 engages the internal rib 35.

A floating annular seal 37 is free to slide between the internal ribs 24 and 35 while sealingly engaging the piston rod 12 and the cylinder wall. The seal 37 is of elastomeric material and includes an outer annular lip 38 that slidingly engages the cylinder wall and an inner annular lip 39 that slidingly engages the piston rod. The seal 37 is reinforced by a metal ring 40 secured thereto on the side thereof facing the internal rib 24. The ring 40 is adapted to engage the internal rib 24 and is strong enough to withstand the gas pressure from the chamber 17 without deforming or passing by the rib 24.

When the pneumatic spring 10 is manufactured, the cylinder cavity is first charged with a gas, preferably air or nitrogen, under high pressure by techniques well known to the art. Then a liquid, preferably a fairly viscous oil, is introduced by well known techniques to fill the chamber 42 between the seals 22 and 37. Enough liquid is pumped into this chamber to float the seal 37 up against the internal rib 35, displacing all gas from this chamber and into the chamber 17.

As noted hereinafter in connection with the embodiment of FIG. 3, a mechanical compression spring may be provided if desired to supplement the floating action of the liquid and urge the seal 37 against the rib 35.

The oil in the chamber 42 works slowly past the seal 22 as this seal leaks or wears, during which time the floating seal 37 moves toward the seal 22. During this movement of the floating seal 37, however, there is minimal pressure differential across it, resulting in little friction or wear on this seal, minimal passage of gas past it into the chamber 42, mostly oil in contact with the seal 22 during its operating life, and excellent lubrication of the seal 22 for all temperatures and orientations of the pneumatic spring 10, as discussed above.

Eventually the floating seal 37 will stop against the internal rib 24 as shown in phantom at 37A and act as a secondary or safety seal, containing the remaining gas and oil pressure in the pneumatic spring.

The modified seal shown in FIG. 2 is identical to that of FIG. 1 except as shown otherwise and now described. Here the internal rib 35 is replaced by a pair of closely spaced internal ribs 44 and 45 which anchor an additional guide bushing 47.

The guide bushing 47 provides additional support for the piston rod 12. In addition, the bushing 47 is formed with an annular shoulder 48 facing the chamber 17 that is adapted to engage the disc 15 of the piston assembly, thus reducing breakaway friction by keeping the disc off any internal rib when the piston rod 12 is in its extended position.

The bushing 47 is also formed with an annular shoulder 49 facing the chamber 42 that is adapted to engage the floating seal 37. This provides a non-jamming stop for the floating seal during gas and oil filling.

It has been found that the effectiveness of the floating seal 37 may be still further enhanced by the addition of a mechanical spring to bias it towards the rib 35, i.e., its innermost fully seated position. Such an embodiment of the invention is illustrated in FIG. 3. Except as otherwise described, the embodiment of FIG. 3 may be identical to those of FIGS. 1 and 2.

In FIG. 3, the internal rib 24 is spaced farther inward along the cylinder 11 to provide room for a spring guide bushing 50 which is captured between the fixed seal 22 and the rib 24. The bushing 50 is recessed internally, at 52, to receive a mechanical compression spring 54 acting between a shoulder 56 on the bushing 50 and the floating seal 37. If desired, one or more additional guide bushings 58 may be provided to ensure that the spring 54 does not contact and mar the internal surface of the cylinder 11. A backup ring 60, which may if desired take the form of the bushing 47 in FIG. 2, serves as a stop for the floating seal 37 to prevent it from possibly damaging contact with the rib 35.

The mechanical spring 54 performs a dual function. First, it assures that the floating seal 37 will assume the desired innermost, fully seated position shown in FIG. 3 (and in full lines in FIG. 2) upon the initial filling of the pneumatic spring. Second, by resiliently resisting movement of the floating seal 37 towards the fixed seal 22 as leakage occurs (with wear and time) from the chamber 42, the mechanical spring 54 serves to increase the pressure differential across the floating seal 37, i.e., between the gas chamber 17 and the liquid chamber 42. As will be understood, this pressure differential across the seal 37 will progressively increase as the mechanical spring 54 is compressed with continued fluid leakage past the fixed seal 22. This function of the mechanical spring 54 more evenly distributes the pressure differential between the high pressure gas chamber 17 and the atmosphere over both the floating seal 37 and the fixed seal 22, thereby improving the overall sealing effectiveness of the floating seal-fixed seal combination.

The invention has been shown and described with reference to preferred embodiments thereof. Variations and modifications of the invention will be apparent to persons skilled in the art without departing from the inventive concepts disclosed herein. For example, the floating seal could comprise a metal ring mounting an inner o-ring seal that slidingly engages the piston rod and an outer o-ring seal that slidingly engages the cylinder wall. All such modifications and variations are intended to be within the scope of the invention as defined in the following claims.

We claim:

1. In a pneumatic spring including a cylinder having a side wall, a closed end wall and an apertured end wall defining a sealed cavity therein, a piston rod axially movable into and out of the cavity through the apertured end wall, a piston carried by the piston rod for axial movement within the cavity, a pressurized fluid within the cavity, and fixed sealing means adjacent the apertured end wall and enveloping the piston rod for establishing a seal between the piston rod and the cylinder against substantially the full pressure, relative to atmospheric, of said pressurized fluid, the improvement comprising:

floating sealing means, disposed between the fixed sealing means and the piston and enveloping the piston rod, for establishing a seal between the piston rod and the cylinder capable of sealing against substantially the full pressure, relative to atmospheric, of said pressurized fluid, said floating sealing means being axially movable relative to said piston rod and said cylinder and defining with said fixed sealing means a sealed chamber of variable volume surrounding said piston rod;

a liquid filling said sealed chamber, the pressure exerted on said floating sealing means by said pressurized fluid being transmitted to said liquid so that the pressure differential across said floating sealing means is relatively small so long as said sealed chamber remains filled with said liquid; and in the event of leakage of said liquid past said fixed sealing means, said floating sealing means being axially movable outwardly towards said fixed sealing means to contain said liquid in surrounding relationship to said piston rod and, in the event of complete loss of liquid past said fixed sealing means, said floating sealing means functioning as a back-up seal against the loss of said pressurized fluid from said cavity.

2. The spring according to claim 1 wherein the floating sealing means and the fixed sealing means define a variable size chamber therebetween, and including a liquid in the variable size chamber.

3. The spring according to claim 1 wherein the floating sealing means includes an elastomeric sealing member that envelops the piston rod and a rigid reinforcing member disposed between the elastomeric sealing member and the fixed sealing means.

4. The spring according to claim 3 wherein the elastomeric sealing member and the reinforcing member are secured together.

5. The spring according to claim 1 including a bushing mounted on the cylinder side wall for supporting the piston rod and adapted to engage the floating sealing means and the piston.

6. The spring according to claim 1 wherein said pressurized fluid comprises a gas and said liquid comprises a lubricant.

7. The spring device according to claim 1 wherein the improvement further comprises first stop means defining an axially innermost position of said floating sealing means, said floating sealing means being positioned substantially at said axially innermost position in the absence of leakage of liquid from said sealed chamber.

8. The spring according to claim 7 wherein the improvement further comprises second stop means for engaging the floating sealing means extending inwardly of the cylinder side wall adjacent the fixed sealing means.

9. The spring according to claim 7 wherein the improvement further comprises means for resiliently urging the floating sealing means towards the first stop means and resiliently resisting movement of the floating sealing means away from the first stop means, the force exerted on said floating sealing means by said resilient resisting means being insufficient to retain said floating sealing means at said stop position against the force of said pressurized fluid in the event of leakage of liquid from said sealed chamber.

* * * * *